United States Patent
Peleg et al.

(10) Patent No.: US 10,998,957 B2
(45) Date of Patent: May 4, 2021

(54) LOW POWER NETWORK WITH EXTENDED COVERAGE

(71) Applicant: CAPACICOM LTD., Kfar Netter (IL)

(72) Inventors: Dan Peleg, Sde-Yizhak (IL); Christophe Jean Bataillard, London (GB); Daniel Wajcer, Beit-Yehoshua (IL)

(73) Assignee: CAPACICOM LTD.

( * ) Notice: Subject to any disclaimer, the term of this patent is extended or adjusted under 35 U.S.C. 154(b) by 0 days.

(21) Appl. No.: 16/636,645

(22) PCT Filed: Sep. 4, 2018

(86) PCT No.: PCT/IB2018/056727
§ 371 (c)(1),
(2) Date: Feb. 5, 2020

(87) PCT Pub. No.: WO2019/058197
PCT Pub. Date: Mar. 28, 2019

(65) Prior Publication Data
US 2020/0389225 A1    Dec. 10, 2020

Related U.S. Application Data

(60) Provisional application No. 62/562,513, filed on Sep. 25, 2017, provisional application No. 62/681,111, filed on Jun. 6, 2018.

(51) Int. Cl.
*H04B 7/155*    (2006.01)
*H04W 52/24*    (2009.01)
*H04W 72/12*    (2009.01)

(52) U.S. Cl.
CPC ............ *H04B 7/155* (2013.01); *H04W 52/24* (2013.01); *H04W 72/12* (2013.01)

(58) Field of Classification Search
CPC ...... H04B 7/14; H04B 7/155; H04B 7/15507; H04B 7/15542; H04W 47/122;
(Continued)

(56) References Cited

U.S. PATENT DOCUMENTS

2010/0238826 A1    9/2010 Borran et al.
2012/0135777 A1    5/2012 Karpoor et al.
(Continued)

FOREIGN PATENT DOCUMENTS

WO    2014138523 A1    9/2014

OTHER PUBLICATIONS

International Application # PCT/IB2018/056727 search report dated Jan. 30, 2019.
(Continued)

*Primary Examiner* — Kan Yuen
(74) *Attorney, Agent, or Firm* — Kligler & Associates Patent Attorneys Ltd

(57) ABSTRACT

A communication network (20) includes one or more replay modules (64), one or more repeaters (68) and one or more processors (72), (84) and (70). The replay modules are configured to connect by Radio Frequency (RF) cable (82) to RF interfaces (52) of respective Base Stations (BSs) (32) that provide connectivity between wireless devices (24) and servers (26) over a packet network (28). Each of the repeaters is configured to wirelessly communicate with one or more wireless devices, and to further communicate with one or more BSs via respective replay modules. The processors are configured to receive messages originating from one or more of the wireless devices and destined to the servers, to process the messages to determine a scheduling plan for transmitting the messages to one or more selected BSs, and to emulate to the selected BSs transmissions of the wireless devices, by transmitting the messages to the selected BSs via the respective replay modules, in accordance with the scheduling plan.

26 Claims, 4 Drawing Sheets

(58) Field of Classification Search
CPC ... H04W 47/125; H04W 47/14; H04W 52/00; H04W 52/0203; H04W 52/24; H04W 52/241; H04W 52/243; H04W 72/12; H04W 72/1252; Y02D 10/00; Y02D 30/00; Y02D 30/70
See application file for complete search history.

(56) References Cited

U.S. PATENT DOCUMENTS

| | | | |
|---|---|---|---|
| 2012/0201190 A1* | 8/2012 | Sawai | H04B 7/2606 370/315 |
| 2013/0039259 A1 | 2/2013 | Senarath et al. | |
| 2017/0086012 A1 | 3/2017 | Jiménez et al. | |
| 2017/0223603 A1* | 8/2017 | Doi | H04B 7/15 |

OTHER PUBLICATIONS

International Application # PCT/IB2018/056729 search report dated Jan. 27, 2019.

International Telecommunication Union (ITU) Radio Regulations Articles, pp. 1-442, Edition of 2016.

Raza et al., "Low Power Wide Area Networks: An Overview", IEEE Communications Surveys & Tutorials, vol. 19, issue 2, pp. 855-873, year 2017.

Peleg et al., U.S. Appl. No. 16/636,648, filed Feb. 5, 2020.

* cited by examiner

LOW POWER NETWORK WITH EXTENDED COVERAGE

CROSS-REFERENCE TO RELATED APPLICATIONS

This application claims the benefit of U.S. Provisional Patent Application 62/681,111, filed Jun. 6, 2018, and of U.S. Provisional Patent Application 62/562,513, filed Sep. 25, 2017, whose disclosures are incorporated herein by reference.

TECHNICAL FIELD

Embodiments described herein relate generally to communication networks, and particularly to methods and systems for extending the coverage of a low power network.

BACKGROUND

A Low Power Wide-Area Network (LPWAN) is a wireless communication network that provides connectivity for low power wireless devices over large geographical areas. A survey of LPWAN technologies can be found, for example, in "Low Power Wide Area Networks: An Overview," IEEE Communications Surveys & Tutorials, volume 19, issue 2, 2017.

LPWANs can be used, for example, for connecting Internet of Things (IoT) and other wireless devices to the Internet, e.g., over an Industrial, Scientific and Medical (ISM) radio band. The frequency allocation of ISM bands is specified, for example, in Article 5 of the "ITU Radio Regulations Articles," edition of 2016.

LPWAN technologies and vendors include, for example, Sigfox, LoRa, Narrowband IoT (NB-IoT), LTE-M—the abbreviation for LTE Cat-M1 or Long Term Evolution (LTE) category M1, Weightless, NWave, Ingenu—formerly known as On-Ramp Wireless that provides the Random Phase Multiple Access (RPMA) technology, and the DASH? Alliance (D7A) protocol, to name only a few.

SUMMARY

An embodiment that is described herein provides a communication network that includes one or more replay modules, one or more repeaters and one or more processors. The one or more replay modules are configured to connect by Radio Frequency (RF) cable to RF interfaces of respective Base Stations (BSs) that provide connectivity between wireless devices and one or more servers over a packet network. Each of the one or more repeaters is configured to wirelessly communicate with one or more of the wireless devices, and to further communicate with one or more of the BSs via respective replay modules. The processors are configured to receive messages originating from one or more of the wireless devices and destined to the servers, to process the messages to determine a scheduling plan for transmitting the messages to one or more selected BSs, and to emulate to the selected BSs transmissions of the wireless devices, by transmitting the messages to the selected BSs via the respective replay modules, in accordance with the scheduling plan.

In some embodiments, the processors are configured to determine the scheduling plan by selecting for each message at least one of: a time resource, a frequency resource, and an identity of one or more target BSs. In other embodiments, a repeater is configured to wirelessly receive a message transmitted by a wireless device, and to send the received message directly to a replay module of a selected BS. In yet other embodiments, a first repeater is configured to wirelessly receive a message transmitted by a wireless device or by a second repeater, and to send the received message to a replay module of a selected BS.

In an embodiment, a replay module is configured to wirelessly receive a message transmitted by a wireless device, and to transmit the message to the respective BS directly via the RF cable. In another embodiment, the processors are configured to receive multiple copies of a same message that are transmitted by a wireless device, and to filter the copies by sending to a target BS a partial subset of the multiple copies. In yet another embodiment, the processors are configured to determine the scheduling plan by scheduling transmissions to target BSs in accordance with a criterion that aims to balance traffic load among the target BSs.

In some embodiments, the processors are configured to sense whether a given BS is currently transmitting or receiving, and in response to detecting that the given BS is currently transmitting, to wait until the given BS returns to a reception mode before transmitting any message to the given BS via the RF cable. In other embodiments, the processors are configured to emulate, to a target BS, a transmission of a wireless device by providing to the respective replay module information indicative of a reception quality at a repeater that intercepted the transmission of the wireless device, and to adjust a transmission power in the replay module based on the information provided. In yet other embodiments, the processors are configured to schedule transmission of one or more messages that were received by one or more repeaters and sent to multiple target BSs, and to adjust a transmission power in the respective replay modules of the target BSs based on at least one of respective identities of the repeaters and respective reception quality levels in the repeaters.

In an embodiment, a repeater is configured to wirelessly receive a message over a given wireless link, and to refrain from re-transmitting the received message wirelessly over the given wireless link. In another embodiment, a repeater or a replay module is configured to receive a message from a wireless device in accordance with a first protocol, and the processors are configured to transmit the received message to a target BS via the RF cable in accordance with a second different protocol. In yet another embodiment, a replay module is configured to receive from a respective BS a message destined to a target EP, and the processors are configured to select one or more repeaters whose respective coverage areas contain the target EP, and to forward the message only to the selected repeaters.

There is additionally provided, in accordance with an embodiment that is described herein, a method for communication, including, in a communication network that includes one or more replay modules and one or more repeaters, the replay modules connect by Radio Frequency (RF) cable to RF interfaces of respective Base Stations (BSs) that provide connectivity between wireless devices and one or more servers over a packet network, and each repeater wirelessly communicates with one or more of the wireless devices, and further communicates with one or more of the BSs via respective replay modules, receiving by one or more processors of the communication network messages originating from one or more of the wireless devices and destined to the servers. The messages are processed to determine a scheduling plan for transmitting the messages to one or more selected BSs. Transmissions of the wireless devices are emulated to the selected BSs by transmitting the messages to the selected BSs via the respective replay modules, in accordance with the scheduling plan.

These and other embodiments will be more fully understood from the following detailed description of the embodiments thereof, taken together with the drawings in which:

DETAILED DESCRIPTION OF EMBODIMENTS

Overview

Figure 1:
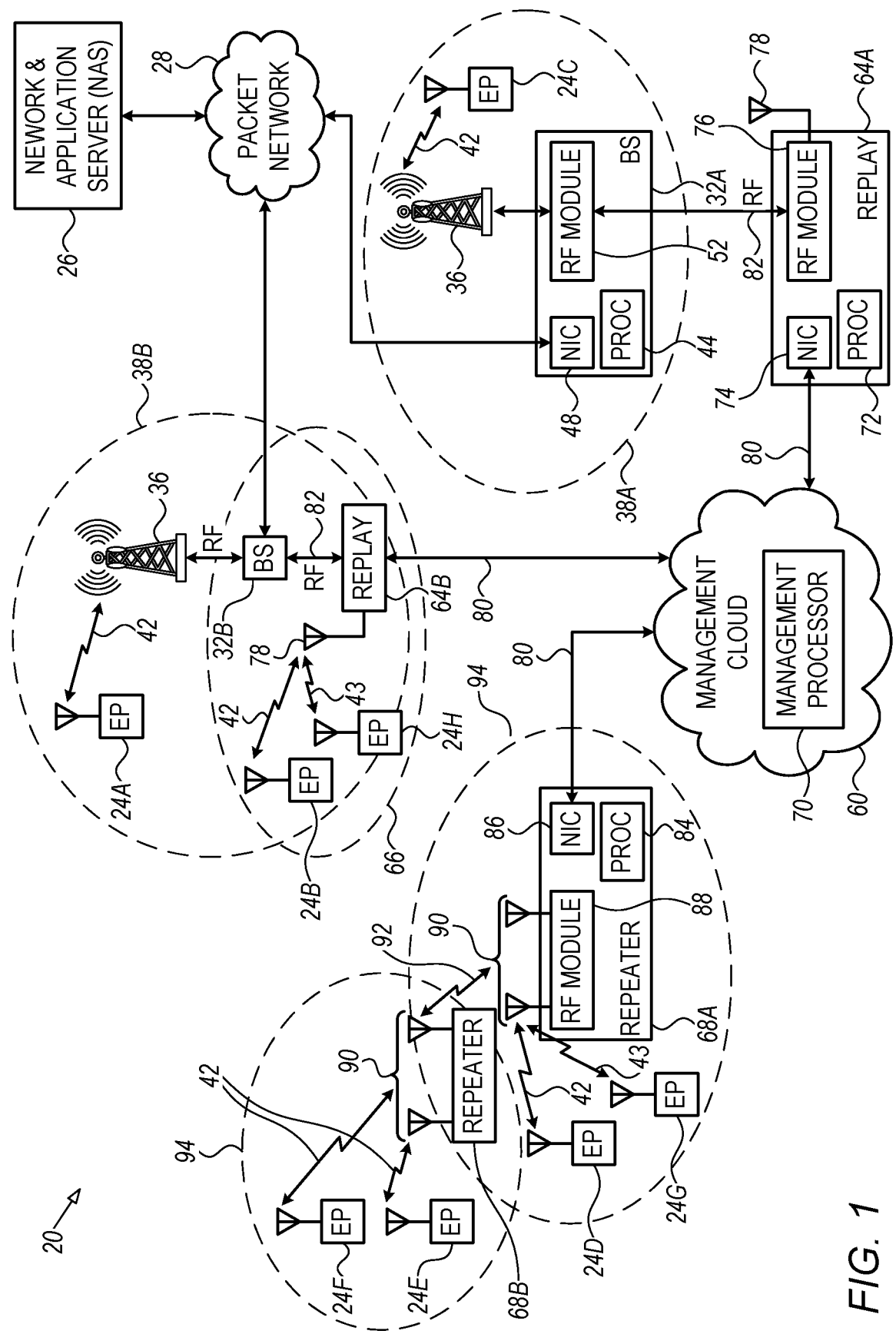
FIG. 1 is a block diagram that schematically illustrates a Low Power Wide Area Network (LPWAN) with extended coverage, in accordance with an embodiment that is described herein.

Low Power Wide-Area Networks (LPWANs) are designed to provide connectivity for low-power, low-cost and low-throughput wireless devices operating on battery power. LPWANs typically support a range of several kilometers and battery life of several years. Devices suitable for connecting to a LPWAN may comprise, for example, Internet of Things (IoT) or Machine-to-Machine (M2M) devices. For reliable communication and long battery life, a LPWAN typically operates at a low data rate on the order of tens of kilobits per second.

The wireless devices in a LPWAN are also referred to herein as End Point (EP) devices or simply "EPs" for brevity. The LPWAN comprises gateways or Base Stations (BSs), which mediate between wireless EPs located within their coverage area and a central packet network or cloud, e.g., the Internet. The EPs typically communicate over the LPWAN with one or more remote servers such as, for example, a Network and Application Server (NAS) or any other suitable type of server.

The communication between the BSs and EPs may have limited reliability, for example, when lacking line of sight to the BS, or in areas vulnerable to noise and interference. In principle, the LPWAN coverage can be extended by deploying additional BSs, but this approach is costly, and increases traffic volume and overall complexity.

Embodiments that are described herein provide improved systems and methods for extending the coverage of a LPWAN. In the disclosed techniques, the LPWAN comprises an extension network that comprises replay modules and repeaters interconnected using a management cloud.

Each replay module is coupled via a Radio Frequency (RF) cable to a RF interface (e.g., antenna port) of a respective BS. Each repeater communicates wirelessly with one or more of the EPs, and over a dedicated packet network with one or more BSs via respective replay modules. The deployment of a repeater is typically much cheaper than adding a full BS to the LPWAN.

The extension network is managed using one or more processors, including a management processor coupled to the management cloud, and processors residing respectively in the replay modules and the repeaters. In the context of the present disclosure and in the claims, the tasks involved in managing the various elements of the extension network are not restricted to any particular partitioning among the management processor and other processors. In other words, a given management task can be carried out using any suitable combination of one or more processors located anywhere in the extension network, which are collectively referred to herein as "processors."

Elements of the LPWAN such as BSs, repeaters and EPs can be selected in certain communication scenarios using any suitable predefined identifiers, as will be described below.

In some embodiments, the processors receive uplink messages originating in one or more EPs and destined to the NAS, and downlink messages originating in the NAS and destined to one or more target EPs. Uplink messages may be used, for example, for reporting to the NAS measurements taken locally by the EPs. Downlink messages may be used, for example, for EP configuration and version updating. The processors process the uplink and downlink messages to determine a scheduling plan for transmitting the uplink messages to one or more selected BSs, and the downlink messages to the target EPs. In some embodiments, the processors determine the scheduling plan to optimize the LPWAN performance, e.g., by balancing traffic load among the BSs, avoiding collisions in using time-frequency resources over the air, and the like.

In the uplink direction, the processors emulate to the selected BSs transmissions of the EPs by transmitting uplink messages to the selected BSs via the respective replay modules, over the RF cable, in accordance with the scheduling plan. In the downlink direction, a replay module receives downlink messages from the respective BS over the RF cable, and the processors schedule wireless transmissions of the downlink messages to the target EPs via one or more repeaters or replay modules, in accordance with the scheduling plan.

The extension network may support several operating modes, such as: (i) a single-repetition mode in which a repeater is coupled directly to the management cloud, (ii) a multi-repetition mode in which a first repeater is coupled to the management cloud and communicates wirelessly with a second repeater over a dedicated wireless link, wherein the second repeater communicates wirelessly with the EP, and (iii) a replay-direct mode in which a replay module communicates directly (not via any repeater) with an EP over the air.

In some embodiments, the processors modify the content of the messages, e.g., for converting between source and destination protocols or standards. In some embodiments, the processors add to the uplink messages information indicative of the reception quality by the repeater or replay module. The replay modules use this information for adjusting the RF transmission power level toward the BSs.

In some embodiments, the processors schedule the transmission of an uplink message originating by an EP to multiple target BSs, for supporting geolocation estimation of the EP. In such embodiments, the processors set the RF transmission power levels to be applied by the respective replay modules based on the identity of the repeater that intercepted the uplink transmission. Using this technique, geolocation processes that are based on received signal strength can be used, even though the signals are provided to the BSs over a cable. Some practical considerations regarding EP geolocation estimation will be described further below.

In some embodiments, to increase the probability of reception, an EP transmits multiple copies of the same uplink message. Since the RF cable between the repeater and BS is much less vulnerable to noise and interference than the wireless link, in some embodiments the processors filter out at least some of the redundant message copies, thus reducing the traffic volume.

In the disclosed techniques, repeaters coupled to a management cloud provide wireless access to remote EPs at any desired range. Emulation of wireless communication with the BSs with EPs is carried out using replay modules via RF cable, which provides a high-quality communication link. By interfacing to the RF interface of the BSs, integrating the extension network to the BS is simple and requires no special interface customization. By analyzing the traffic flowing through the management cloud, the transmissions over the air are scheduled optimally, thus improving the LPWAN performance and reducing deployment costs and complexity.

System Description

FIG. 1 is a block diagram that schematically illustrates a Low Power Wide Area Network (LPWAN) 20 with extended coverage, in accordance with an embodiment that is described herein. The LPWAN of FIG. 1 provides two-way connectivity between End-Point (EP) devices 24 and a packet network 28.

LPWAN 20 can be used in various applications that require long range access for a large number of low-cost low-power wireless devices, such as, for example, smart cities, home automation, logistics, environmental monitoring, remote metering and control, and the like.

EPs 24 may comprise, for example, an Internet of Things (IoT) metering or other devices that exchange short messages with servers coupled to packet network 28, such as a Network and Application Server (NAS) 26. Alternatively, other suitable types of server 26 can also be used. Packet network 28 comprises a packet network or cloud, operating in accordance with any suitable protocols. Packet network 28 may comprise, for example, an IP network such as the Internet, or an Ethernet network.

In LPWAN 20 of FIG. 1, EP 24 comprises a wireless device, usually operating on battery power. For maximal battery life, EP 24 is typically allowed to transmit short messages at low power. For reliable communication over long ranges, the EPs typically communicate messages over the air at a low bitrate, e.g., 50 Kbit per second or lower.

LPWAN 20 comprises Base Stations (BSs) 32, which communicate wirelessly with EPs 24 and are coupled to packet network 28. BS 32 communicates messages modulated in Radio Frequency (RF) signals, using a suitable modulation scheme, via an antenna (or antenna tower) 36 with EPs located in some respective coverage area 38 of the BS. In some embodiments, BS 32 and EP 24 communicate with one another using a suitable modulation technique. A coverage area of a BS includes geographical locations at which EPs communicate reliably with that BS. A BS cannot communicate directly, via antenna 36, with any EP located outside its coverage area, i.e., the overall coverage region supported wirelessly by the BSs alone is typically limited.

In FIG. 1, EPs 24 communicate with BSs 32 over a wireless link 42, also referred to as an EP-BS link, which is typically specified within suitable protocols that define parameters such as transmission power, bit-rate, modulation techniques, and transmission scheduling. EP-BS link 42 additionally specifies messaging parameters such as message format and length and redundancy information attached to the message, if any.

The transmission direction from the EPs toward the BSs is referred to as uplink (UL), and the transmission direction from the BSs toward the EPs is referred to as downlink (DL).

In an example embodiment, LPWAN 20 may be based on the "Sigfox" network, in which case EP-BS link 42 uses the Ultra Narrow Band (UNB) modulation band, wherein each message occupies a frequency band of 100 Hz or 600 Hz and transferred at a data rate of 100 or 600 bits per second, depending on the region. An uplink Sigfox frame comprises 26 bytes or less, of which the payload part comprises up to 12 bytes.

In some embodiments, EPs 24 are not pre-associated with specific BSs, but are configured to broadcast uplink messages that may be intercepted by one or more BSs, which monitor the relevant radio spectrum for EP transmissions.

As depicted in the detailed block diagram of BS 32A, the BS comprises a processor 44, a Network Interface Controller (NIC) 48 and a RF module 52. Processor 44 carries out the various communication and management tasks of the BS. NIC 48 handles packet communication between the BS and packet network 28, in accordance with the underlying network protocols. RF module 52 comprises a RF transmitter and a RF receiver (not shown) for transmitting and receiving RF signals to and from EPs 24 via antenna 36 over EP-BS link 42. RF module 52 additionally communicates RF signals over cable, which emulates communication with EPs that may be located outside the coverage area, as will be described in detail below.

In practical deployments, one or more of EPs 24 may not belong to the coverage area of any of BSs 32. Areas that may be difficult to cover wirelessly include, for example, underground areas such as a subway station or a basement, the inside of or areas hidden by buildings, and varying terrains. In some embodiments, LPWAN 20 extends the coverage area of the BSs, using an extension network comprising a management cloud 60, one or more replay modules 64 and one or more repeaters 68, as will be described below.

Management cloud 60 typically comprises communication means e.g., switches or routers (not shown) for communicating with replay modules 64 and repeaters 68 over dedicated links 80. Management cloud 60 manages packet communication over links 80 using any suitable protocol(s). The extension network enables reliable communication with remote repeaters residing outside the coverage area of the BSs, thus covering remote and difficult areas. In some embodiments, management cloud 60 comprises a management processor 70, which analyses the traffic flowing through the management cloud and schedules uplink transmissions from the replay modules to the respective BSs over cable and downlink wireless transmissions from the repeaters to the EPs, as will be described in detail below.

Each BS 32 is associated with a respective replay module 64. As depicted in the block diagram of replay module 64A, the replay module comprises a processor 72, a NIC 74, a RF module 76 and optionally an antenna 78. Processor 72 handles the various functions of the replay module. Using NIC 74, the replay module communicates messages, over link 80, with elements coupled to management cloud 60, such as management processor 70 and repeaters 68.

RF module 76 of the replay module comprises a RF transmitter and a RF receiver (not shown). RF module 76 exchanges messages modulated in RF signals with EPs 24 via antenna 78, with a respective BS over a RF cable 82, or both. One end of RF cable 82 is coupled to RF module 76 of the replay module, and the other end of RF cable 82 is coupled to RF module 52 of the respective BS. RF cable 82 comprises a wire interconnection for RF signals, e.g., a coaxial cable. RF cable 82 provides a reliable communication link that is much less sensitive to noise and interference compared to EP-BS link 42.

Replay module 64 typically communicates wirelessly with EPs 24 via antenna 78 using the same protocols specified the EP-BS link 42. Alternatively, or additionally, the replay module supports communicating with EPs 24 using another different wireless link protocol. For example, in FIG. 1, replay module 64B communicates with EP 24H using a wireless link 43, which specifies different protocols than EP-BS link 42. In such embodiments, the replay module communicates with an EP using wireless link 43 via antenna 78, and with the BS over the RF cable using the protocols of EP-BS link 42. In an embodiment, wireless link 43 comprises a different version of the protocol suite specifying EP-BS link 42.

In some embodiments, the receiver of RF module 76 of the replay module is more sensitive than the receiver of RF module 52 of the BS, which extends the coverage range for direct wireless reception. In some embodiments, the rate of injecting uplink messages by a replay module toward the respective BS via RF cable 82 can be very high and is not restricted to a low duty cycle as specified in some LPWAN over ISM standards.

The transmitter and receiver of RF module 76 respectively modulate and demodulate messages into RF signals in accordance with the wireless protocol of EP-BS link 42. The coverage area of replay module 64 for communicating with EPs is depicted as a region 66 in the figure. In the example of FIG. 1, coverage area 38B of BS 32B partially overlaps coverage area 66 of replay module 64B.

As depicted in the block diagram of repeater 68A, the repeater comprises a processor 84, a NIC 86, a RF module 88 and one or more antennas 90. Processor 84 handles the various functions of the repeater, as will be described in detail below. Using NIC 86, the repeater communicates with elements coupled to management cloud 60, e.g., such as management processor 70 and replay modules 64. RF module 88 comprises a RF transmitter and a RF receiver (not shown) that exchange RF signals with EPs 24, with other repeaters, or both.

The repeater communicates with EPs 24 in accordance with the protocols specified for EP-BS link 42, and with other repeaters in accordance with a dedicated wireless link 92. The repeater coverage area for communicating with EPs and other repeaters is depicted as region 94. In the example of FIG. 1, the coverage area of repeater 68A includes repeater 68B.

In some embodiments, instead of, or in addition to using EP-BS link 42, the repeater supports communicating wirelessly with EPs using a different wireless link such as wireless link 43. In FIG. 1, for example, repeater 68A supports communicating with EP 24D using the EP-BS link 42 and with EP 24G using wireless link 43.

In the uplink direction, an EP message originating in an EP can be delivered to a target BS in various routes. In an example embodiment, a repeater wirelessly intercepts the EP message and sends the message to a replay module via the management cloud. The replay module then transmits the message to the respective BS over cable. In another embodiment, a first repeater wirelessly intercepts the EP message over EP-BS link 42 and re-transmits the message over dedicated wireless link 92 to a second repeater that connects to the replay module of the target BS via the management cloud. In yet another embodiment, the replay module of the target BS wirelessly intercepts the EP message over EP-BS link 42, and transmits the message to the BS over the RF cable.

In the downlink direction, an EP message originating in NAS 26 and destined to a target EP can be routed in various ways. The BS first transmits the EP message via the RF cable to the respective replay module. In one embodiment, the replay module forwards the EP message via the management cloud to a selected repeater that wirelessly covers the target EPs. The selected repeater transmits the EP message over EP-BS link 42 to the target EP. In another embodiment, the selected repeater transmits the EP message over dedicated wireless link 92 to another repeater, which transmits the EP message over EP-BS link 42 to the target EP. In yet another embodiment, the replay module does not forward the message to the management cloud, but instead, transmits the EP message directly to the target EP over EP-BS link 42 via antenna 78.

In some embodiments, an EP message flowing through the extension network is re-formatted, e.g., by the management processor. In an example embodiment, the management processor (or a processor in the repeater or replay module) converts the massage from a source format of the EP to a destination format of the BS. Alternatively or additionally, the repeater adds to the received message information regarding the reception quality at the repeater. Such information may be used for emulating to the BS any suitable metric such as Signal to Noise Ratio (SNR), Time of Arrival (ToA), and/or Received Signal Strength Indicator (RSSI).

In some embodiments, one or more of repeaters 68 are implemented using a conventional mobile terminal such as a cellular phone or smartphone. In such embodiments, the mobile terminal runs an application program that implements the functionality of the repeater. Instead of using NIC 86, the mobile terminal accesses the management cloud wirelessly via the wireless communication network to which the mobile terminal connects.

The configuration of LPWAN 20 in FIG. 1 is chosen purely for the sake of conceptual clarity. In alternative embodiments, any other suitable LPWAN configuration having extended coverage can also be used.

The different elements of replay module 64, repeater 68 and management cloud 60 may be implemented using suitable hardware, such as in one or more Application-Specific Integrated Circuits (ASICs) or Field-Programmable Gate Arrays (FPGAs).

In some embodiments, some elements of replay module 64, repeater 68 and management cloud 60, e.g., processor 84, processor 72 and management processor 70 can be implemented using software, or using a combination of hardware and software elements. Elements of replay module 64, repeater 68 and management cloud 60 that are not mandatory for understanding of the disclosed techniques have been omitted from the figure for the sake of clarity.

In some embodiments, some or all of the functions of the various processors in the extension network, e.g., management processor 70, processors 84 and processors 72, may be implemented in one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

In LPWAN 20 the partition of tasks among management processor 70, processor 84 and processor 72 is flexible and not restricted to any mandatory partition. In an example embodiment, management processor 70 analyzes the traffic flowing through the management cloud, and based on the analysis results determines a scheduling plan for the uplink and downlink wireless transmissions. In some embodiments, the functionality of management processor 70 may be partitioned among multiple processors.

Although in the LPWAN configuration of FIG. 1 management cloud 60 and packet network 28 are separate network, this is not mandatory. In alternative embodiments, a single communication network implements both packet network 28 and management cloud 60.

Managing LPWAN with Extended Coverage

Figure 2:
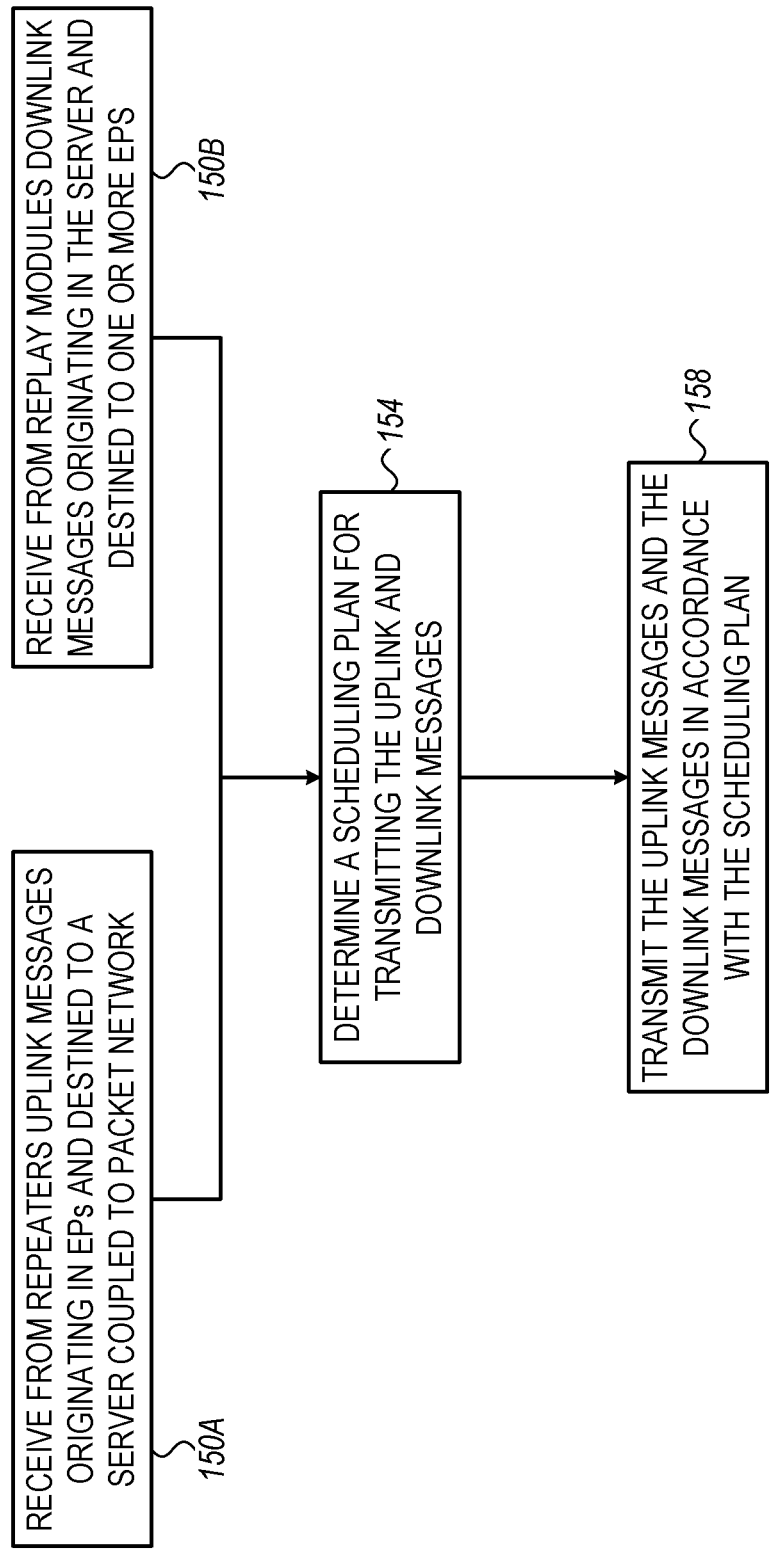
FIG. 2 is a flow chart that schematically illustrates a method for managing a LPWAN with extended coverage, in accordance with an embodiment that is described herein.

FIG. 2 is a flow chart that schematically illustrates a method for managing LPWAN 20 with extended coverage, in accordance with an embodiment that is described herein. The method will be described as being executed by at least one of management processor 70, processors 72 of replay modules 64 and processors 84 of repeaters 68. These processors are collectively referred to herein as "processors."

The method begins with the processors receiving uplink messages from one or more repeaters in the LPWAN, at an uplink reception step 150A, and downlink messages (e.g., originating in severs such as NAS 26) from one or more replay modules 64 of respective BSs 32, at a downlink reception step 150B.

Each uplink EP message is transmitted wirelessly by an EP 24 over EP-BS link 42 and received by one or more repeaters 68. The uplink EP message is destined, for example, to NAS 26 coupled to packet network 28. The repeater demodulates the uplink EP message from the uplink transmission and sends the uplink EP message to one or more target BSs via management cloud 60.

Each downlink message comprises a downlink EP message originating by NAS 26 and destined to one or more target EPs via one or more BSs over packet network 28. A BS receiving a downlink EP message transmits the downlink EP message via RF cable 82 to the respective repeater, which further transmits the downlink EP message wirelessly over EP-BS link 42 to the EPs. In practical implementations, steps 150A and 150B are typically executed in parallel.

At a scheduling determination step 154, the processors analyze the state of the extended LPWAN, and based on the analysis results determine a scheduling plan for transmitting the uplink EP messages via the replay modules to the BSs, and the downlink EP messages via the repeaters to the EPs. Since the processors are aware of the traffic communicated between the EPs and NAS 26, the processors can determine a scheduling plan that optimally utilizes time and frequency resources over the air, and that improves the overall LPWAN performance.

At a forwarding step 158, the processors execute uplink and downlink message transmissions in accordance with the scheduling plan of step 154. Following step 158, the method terminates.

Message Flow in LPWAN with Extended Coverage

Extending the coverage in a network such as LPWAN 20 can be handled in various ways. The main modes of operation supported by LPWAN 20 include (i) single-repetition mode, (ii) multi-repetition mode, and (iii) replay-direct mode. The three modes are described below in detail.

Figure 3:
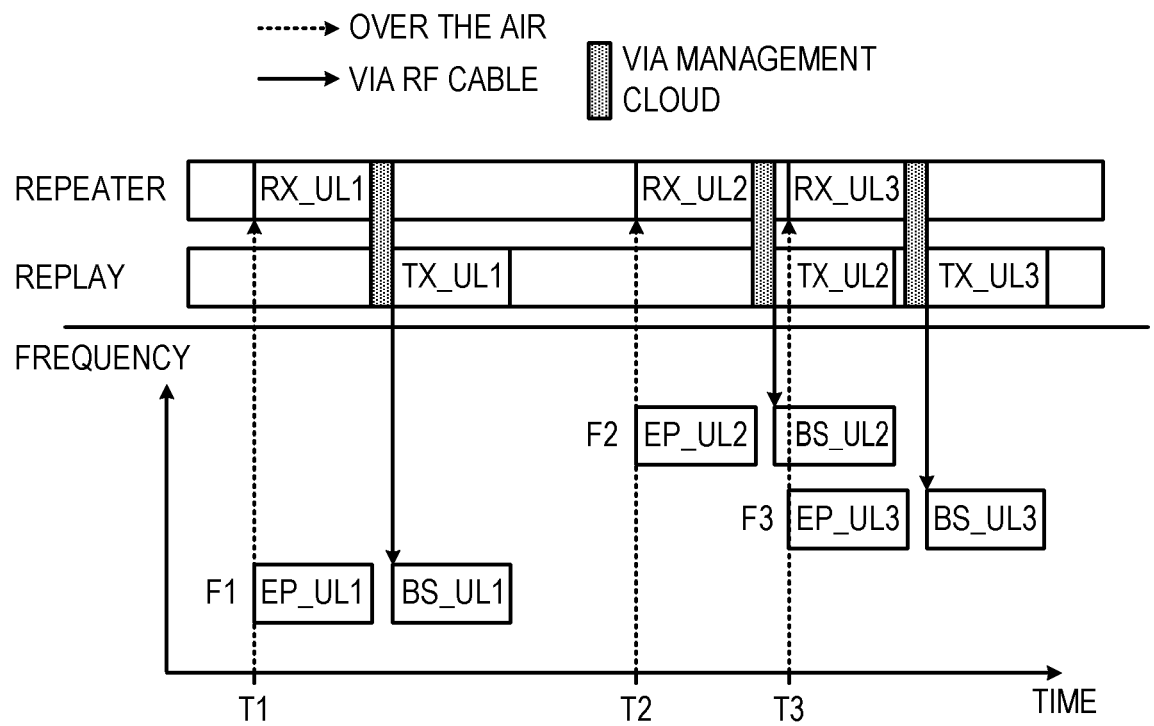
FIG. 3 is a diagram that schematically illustrates uplink message flow using a single-repetition mode, in accordance with an embodiment that is described herein.

FIG. 3 is a diagram that schematically illustrates uplink message flow using a single-repetition mode, in accordance with an embodiment that is described herein. In the example of FIG. 3, EP 24D transmits three uplink messages denoted EP_UL1, EP_UL2 and EP_UL3, over EP-BS link 42. The uplink transmissions are intercepted by repeater 68A, which forwards the messages via the management cloud to replay module 64B. Replay module 64B transmits the messages to BS 32B via RF cable 82.

The lower part of the diagram depicts time-frequency resources used by EP 24D and repeater 68A over EP-BS link 42, and by replay module 64B and BS 32B over the RF cable connection. The upper part of the diagram depicts activities of repeater 68A and replay module 64B over time.

Up to time denoted T1, repeater 68A scans the relevant RF spectrum for detecting EP transmissions. At time T1, EP 24D starts transmitting an uplink transmission EP_UL1 that modulates the uplink EP message using a frequency resource denoted F1. Repeater 68A intercepts the EP transmission as denoted by the repeater activity RX_UL1, recovers the respective EP message, and sends the EP message to replay module 64B via management cloud 60. The communication activity via the management cloud is depicted as a narrow gray-colored rectangle. The repeater is scanning the RF spectrum continuously for EP transmissions and potentially can receive and decode multiple concurrent transmissions, such as the transmission EP_UL1.

Replay module 64B modulates and transmits the EP message to BS 32B via RF cable 82, using the same frequency resource F1. In the figure, TX_UL1 and BS_UL1 denote the transmission activity of the replay module over the RF cable, and the respective reception activity at the BS side.

Similar message flows apply to the uplink transmissions EP_UL2 and EP_UL3 starting and T2 and T3, using respective frequency resources F2 and F3.

Figure 4:
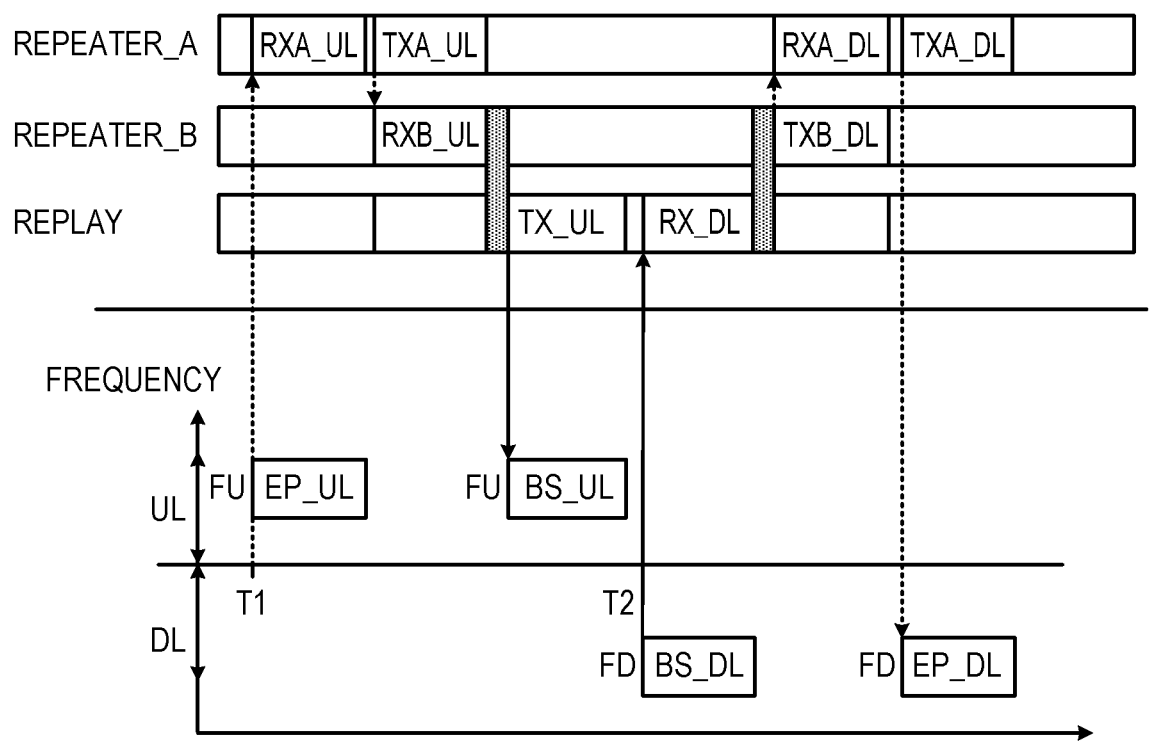
FIG. 4 is a diagram that schematically illustrates uplink and downlink message flows using a multi-repetition mode, in accordance with an embodiment that is described herein.

FIG. 4 is a diagram that schematically illustrates uplink and downlink message flows using a multi-repetition mode, in accordance with an embodiment that is described herein. In the example of FIG. 4, repeater 68A communicates over link 80 with management cloud 60 and wirelessly over dedicated wireless link 92 with repeater 68B, which further communicates wirelessly over EP-BS link 42 with EP 24E. In FIG. 4, repeater 68A is also denoted REPEATER_B, and repeater 68B is also denoted REPEATER_A.

The lower part of the diagram depicts time-frequency resource usage by EP 24E and repeater 68B over EP-BS link 42, by repeaters 68A and 68B over dedicated wireless link 92, and by replay module 64B and BS 32B over the RF cable connection. In this example, different frequency bands are used for the uplink and downlink directions. The upper part of the diagram depicts activities of repeater 68B, repeater 68A and replay module 64B over time.

In the present example, at time T1 EP 24E initiates a wireless uplink transmission denoted EP_UL using a frequency resource FU. The EP_UL transmission carries an uplink EP message destined to NAS 26. Repeater 68B (REPEATER_A in FIG. 4) intercepts the wireless uplink transmission and recovers the EP message. Repeater 68B then re-transmits the recovered EP message over dedicated wireless link 92, to be intercepted by repeater 68A (REPEATER_B in FIG. 4). Repeater 68A recovers the EP message and transmits the recovered EP message via the management cloud, replay module 64B and RF cable 82 to BS 32B. The transmission activity of the replay module is denoted TX_UL, and the parallel reception activity of the BS is denoted BS_UL.

At a time denoted T2, BS 32B initiates a downlink transmission denoted BS_DL via RF cable 82 to replay module 64B. In the present example, the downlink transmission carries a downlink EP message originating by NAS 26 and destined to EP 24E. Replay module 64B recovers the downlink EP message from the downlink transmission and forwards the recovered EP message to repeater 68A via the management cloud. Repeater 68A transmits the downlink EP message wirelessly over dedicated wireless link 92, to be intercepted by repeater 68A, as depicted by parallel activities TXB_DL and RXA_DL. Repeater 68B recovers the downlink EP message and transmits it over EP-BS link 42 to EP 24E as denoted by parallel activities TXA_DL and EP_DL.

Figure 5:
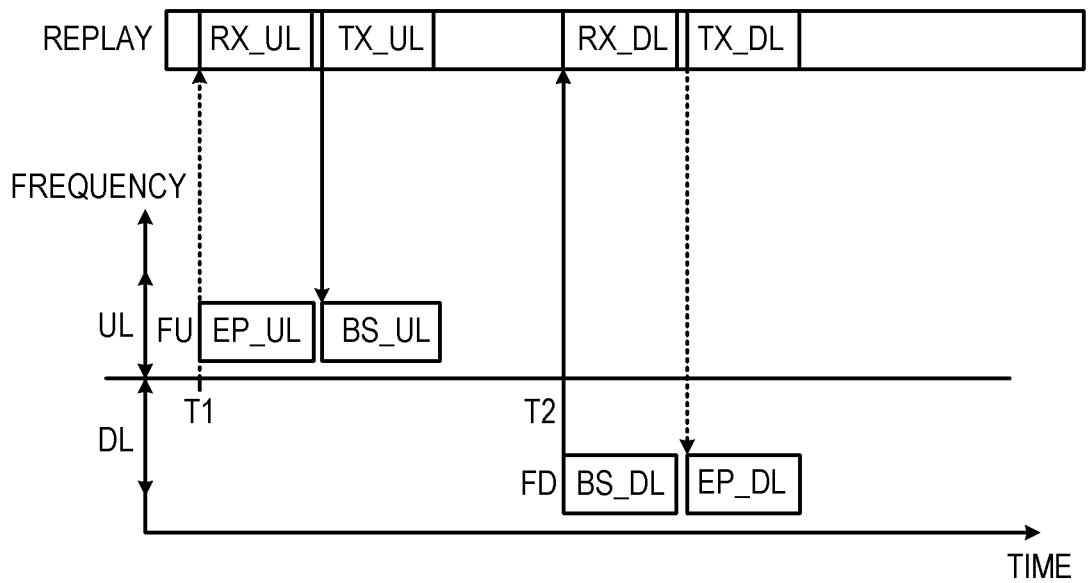
FIG. 5 is a diagram that schematically illustrates uplink and downlink message flows using a replay-direct mode, in accordance with an embodiment that is described herein.

FIG. 5 is a diagram that schematically illustrates uplink and downlink message flows using a replay-direct mode, in accordance with an embodiment that is described herein. In the example of FIG. 5, replay module 64B communicates wirelessly with EP 24B over EP-BS link 42 and further communicates RF signals with BS 32 via RF cable 82.

The lower part of the diagram depicts time-frequency resource usage of EP 24B and replay module 64B over EP-BS link 42, and by replay module 64B and BS 32B over the RF cable connection. In this example, different frequency bands are used for the uplink and downlink directions. The upper part of the diagram depicts activities of replay module 64B over time.

In the present example, at time T1 EP 24B initiates a wireless uplink transmission denoted EP_UL using a frequency resource FU. The transmission carries an uplink EP message destined to NAS 26. Replay module 64B intercepts the wireless uplink transmission and recovers the uplink EP message. Replay module 64B then transmits the recovered EP message to BS 32B via RF cable 82 using the same frequency resource FU. At time T2, BS 32B initiates a RF downlink transmission denoted BS_DL to replay module 64B via RF cable 82. The downlink transmission carries a downlink EP message destined to EP 24B, and uses a frequency resource denoted FD. The replay module recovers the downlink EP message and transmits the downlink EP message to EP 24B over EP-BS link 42, using the same frequency resource FD.

Methods for Optimizing LPWAN Performance

In some embodiments, an EP 24 operates in a region vulnerable to noise and interference. In such embodiments, the EP may communicate over EP-BS link 42 (or wireless link 43) using a robust modulation technique, e.g., having a suitable modulation constellation. Alternatively or additionally, the EP may communicate over link 42 messages that are protected using any suitable Forward Error Correction (FEC) method, e.g., by adding to the message suitable redundancy information in accordance with any suitable Error Correction Code (ECC). Note that in embodiments of this sort, since communicating over the RF cable is highly reliable, the replay module may deliver the messages to the BS without any FEC, which is less complex and incurs minimal latency.

In some embodiments, EP-BS link 42 specifies transmitting an EP message multiple times over the air, so that in noisy environments at least one of the message copies will be intercepted correctly by the receiving party, with high probability. Since the RF cable link between the BS and replay module is much less sensitive to environmental noise interference compared to the wireless EP-BS link such repetition is typically unnecessary, and communicating with the BS a smaller number of the message copies, e.g., only one message copy, is sufficient.

Figure 6:
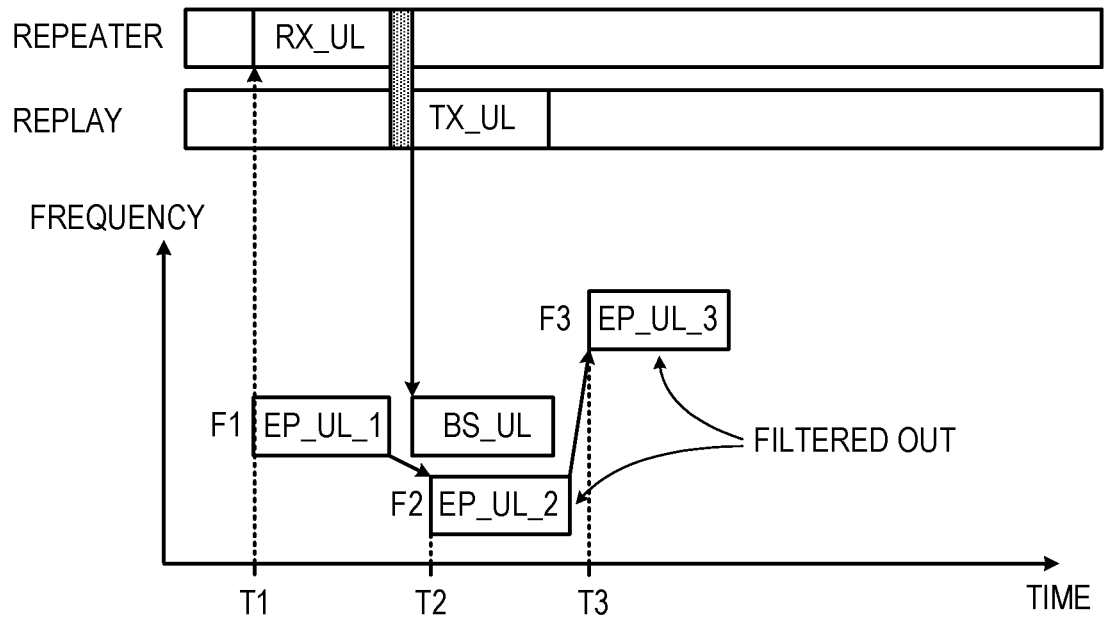
FIG. 6 is a diagram that schematically illustrates a method for filtering redundant message copies, in accordance with an embodiment that is described herein.

FIG. 6 is a diagram that schematically illustrates a method for filtering redundant message copies, in accordance with an embodiment that is described herein. In the example of FIG. 6, EP 24D transmits three copies of the same uplink EP message over EP-BS link 42. The copies of the EP message, transmitted at times T1, T2 and T3 are respectively denoted EP_UL_1, EP_UL_2 and EP_UL_3.

In the present example we assume that the repeater has received EP_UL_1 correctly, and forwards the recovered uplink EP message to the BS via the management cloud and replay module as described above. The processors, however, will refrain from sending message copies EP_UL_2 and EP_UL_3 to the BS, even when received correctly at the repeater. The processors identify the message in each of EP_UL_2 and EP_UL_3 that was received correctly to be a copy of the message in EP_UL_1, and filters these copies out. In some embodiments, filtering the redundant message copies can be carried out at the repeater, to reduce the amount of traffic delivered via the management cloud. In other embodiments, the management processor or replay module filters out the redundant message copies.

In some embodiments, the processors (e.g., the management processor) analyze patterns of the traffic flowing through the management cloud. Based on the analysis results, the processors build a scheduling plan that optimizes the LPWAN performance. In some embodiments, the scheduling scheme defines for each uplink EP message a target BS and time-frequency resources for transmitting the uplink EP message from the replay module to the BS via the RF cable. The scheduling scheme additionally defines for downlink EP messages time-frequency resources for transmission by a target repeater or by the replay module. The processors may determine the scheduling scheme using any suitable method. In an embodiment, the processors determine the scheduling plan in accordance with some performance criteria such as balancing the traffic load among the BSs and avoiding collisions in using time-frequency resources over the air.

In some embodiments, BSs 32 operate in a half-duplex mode, i.e., at any given time the BS can either receive uplink messages or transmit downlink messages over the RF cable (or wireless EP-BS link), but not both simultaneously. In such embodiments, the BS may miss an uplink message transmitted to the BS via the RF cable in a period during which the BS transmits a downlink message via the RF cable. In some embodiments, the replay module senses the transmission/reception status of the BS, e.g., by evaluating the power level present at the RF cable. When the replay module senses a power level above (or below) a predefined threshold power level, the replay module detects that the BS is in transmission (or reception) mode. When the replay module has an uplink message ready for transmission to the BS but detects that the BS is in the transmission mode, the replay module delays any uplink transmissions toward the BS until detecting that the BS has returned to the reception mode.

In some embodiments, the repeater estimates the uplink reception quality and adds this information to the uplink message or to the scheduling plan. Metrics that are indicative of the reception quality comprise, for example, Signal to Noise Ratio (SNR), Time of Arrival (ToA). The replay module of the target BS uses the reception quality metric in emulating to the target BS an EP transmission by adjusting the transmission power of the replay module based on the metric. For example, when the metric indicates low reception quality, the replay module transmits toward the BS at a low power level, and vice versa.

In some embodiments, the LPWAN supports estimating geolocation (e.g., geographical coordinates) of an EP based on receiving an uplink transmission of the EP by multiple BSs. This may be relevant, for example, when the EP comprises a mobile terminal whose location changes in time. In such embodiments, the processors schedule transmission of the EP message to two or more selected BSs. The respective replay modules of the selected BSs adjust the transmission power for emulating wireless transmission of the EP. In some embodiments, the processors may use knowledge of the identity of the repeater that intercepted the uplink transmission, for example, when the EP was intercepted by a single repeater, and possibly the reception quality, to determine the transmission power of the replay modules. In some embodiments, geolocation estimation is based on adjusting the transmission power at the replay module based on at least one of the respective identities of the repeaters and the respective reception quality levels at the repeaters.

In an embodiment, when two or more repeaters intercept an EP transmission, the processors adjust the transmission power in the replay module based on the reception quality in each of the repeaters. This typically provides geolocation estimation that is more accurate than adjusting the replay transmission power based on the identity of the repeaters. Note that the EP may reside outside the coverage area of all the BSs. In such a scenario, for geolocation estimation, the transmission power (over cable) at the replay module may need to be adjusted, by the processors, below the sensitivity level of the BS receiver, which means that the BS cannot provide geolocation information for this EP.

In LPWAN 20, the coverage areas of multiple repeaters may overlap one another. Therefore, an uplink EP message may be undesirably re-transmitted by such repeaters in an infinite loop. In some embodiments, to avoid such a transmission loop, the repeaters in LPWAN 20 are configured to refrain from re-transmitting an uplink message over the same wireless link (EP-BS link 42 or dedicated wireless link 92) over which the message was received.

In some embodiments, NAS 26 sends a downlink EP message to a specific target EP. Since in LPWAN 20 the processors are aware of the network topology and EP identities, the processors can schedule efficient transmission of the downlink message only via one or more repeaters (or replay modules) whose coverage area includes the target EP, rather than broadcasting the downlink message via all the repeaters. As a result, possible interference caused by downlink transmissions to uplink transmissions of other repeaters is reduced. In an embodiment, the processors include in the scheduling plan the transmission power required in transmitting the downlink messages by the respective repeaters. For example, transmitting a downlink message to an EP located close to a repeater requires low power.

In some embodiments, LPWAN 20 supports multiple different specifications of the communication link used by EPs 24 over the air. For example, a given EP may operate in accordance with the specifications of wireless link 43 that are different from the specifications of EP-BS link 42 used by the BSs. This may occur, for example, when a roaming EP operates on a non-regional ISM band different from the ISM band allocated for the BSs. In addition, the bandwidth allocated to messages may differ between the BS and EP. As noted above, wireless link 43 may be specified with protocols different from the protocols specified for EP-BS link 42. Alternatively, wireless link 43 comprises a different version of EP-BS link 42.

In LPWANs of this sort, a repeater or a replay module is configured to support one or more types of wireless links for communication used by EPs at its coverage area, such as both EP-BS link 42 and alternative wireless link 43. Consider, for example, a first wireless link protocol (e.g., wireless link 43) supported by an EP and a second different wireless link protocol (EP-BS link 42) supported by the target BS. The repeater or replay module intercepts an uplink EP message in accordance with the wireless link 43 protocol of the EP, and the replay module transmits the uplink EP message to the BS via the RF cable in accordance with EP-BS link 42 protocol of the BS. Similarly, the BS may transmit a downlink message to a respective replay module via the RF cable in accordance with EP-BS link 42 protocol, and the repeater (or replay module) transmits the downlink EP message to the target EP in accordance with wireless link 43 protocol.

In some embodiments, repeaters 68 should undergo extensive testing to be certified for operation within LPWAN 20. In some applications, a repeater operates in the uplink direction only, i.e., intercepts uplink messages wirelessly and forwards the messages to the target BS via the management cloud and replay module. Since such a repeater is not required to transmit over the air, the certification process for such a repeater is significantly simplified.

The embodiments described above are given by way of example, and other suitable embodiments can also be used. For example, although in the embodiments that were described above, the repeater and replay module use the same frequency resource used for transmitting an uplink message by the EP or a downlink message by the BS, in alternative embodiment, a different frequency resource can be used. Similarly, the repeater may use a different transmission mode than the replay module, such as a different FEC scheme (if any), a different constellation for modulation, and the like.

Although the embodiments described herein mainly address techniques for extending the coverage of a LPWAN, the methods and systems described herein can also be used in other applications, such as in extending the coverage of any other suitable wireless communication system.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. A communication network, comprising:
one or more replay modules, configured to connect by Radio Frequency (RF) cable to RF interfaces of respective Base Stations (BSs) that provide connectivity between wireless devices and one or more servers over a packet network;

one or more repeaters, each repeater configured to wirelessly communicate with one or more of the wireless devices, and to further communicate with one or more of the BSs via respective replay modules; and one or more processors, which are comprised in at least one system component selected from a group consisting of (i) one or more of the replay modules, (ii) one or more of the repeaters, and (iii) a management cloud separate from the replay modules and the repeaters, the one or more processors configured to:

receive messages originating from one or more of the wireless devices and destined to the servers; process the messages to determine a scheduling plan for transmitting the messages to one or more selected BSs; and emulate to the selected BSs transmissions of the wireless devices, by transmitting the messages to the selected BSs via the respective replay modules, in accordance with the scheduling plan.

2. The communication network according to claim 1, wherein the one or more processors are configured to determine the scheduling plan by selecting for each message at least one of: a time resource, a frequency resource, and an identity of one or more target BSs.

3. The communication network according to claim 1, wherein a repeater is configured to wirelessly receive a message transmitted by a wireless device, and to send the received message directly to a replay module of a selected BS.

4. The communication network according to claim 1, wherein a first repeater is configured to wirelessly receive a message transmitted by a wireless device or by a second repeater, and to send the received message to a replay module of a selected BS.

5. The communication network according to claim 1, wherein a replay module is configured to wirelessly receive a message transmitted by a wireless device, and to transmit the message to the respective BS directly via the RF cable.

6. The communication network according to claim 1, wherein the one or more processors are configured to receive multiple copies of a same message that are transmitted by a wireless device, and to filter the copies by sending to a target BS a partial subset of the multiple copies.

7. The communication network according to claim 1, wherein the one or more processors are configured to determine the scheduling plan by scheduling transmissions to target BSs in accordance with a criterion that aims to balance traffic load among the target BSs.

8. The communication network according to claim 1, wherein the one or more processors are configured to sense whether a given BS is currently transmitting or receiving, and in response to detecting that the given BS is currently transmitting, to wait until the given BS returns to a reception mode before transmitting any message to the given BS via the RF cable.

9. The communication network according to claim 1, wherein the one or more processors are configured to emulate, to a target BS, a transmission of a wireless device by providing to the respective replay module information indicative of a reception quality at a repeater that intercepted the transmission of the wireless device, and to adjust a transmission power in the replay module based on the information provided.

10. The communication network according to claim 1, wherein the one or more processors are configured to schedule transmission of one or more messages that were received by one or more repeaters and sent to multiple target BSs, and to adjust a transmission power in the respective replay modules of the target BSs based on at least one of respective identities of the repeaters and respective reception quality levels in the repeaters.

11. The communication network according to claim 1, wherein a repeater is configured to wirelessly receive a message over a given wireless link, and to refrain from re-transmitting the received message wirelessly over the given wireless link.

12. The communication network according to claim 1, wherein a repeater or a replay module is configured to receive a message from a wireless device in accordance with a first protocol, and wherein the one or more processors are configured to transmit the received message to a target BS via the RF cable in accordance with a second different protocol.

13. The communication network according to claim 1, wherein a replay module is configured to receive from a respective BS a message destined to a target EP, and wherein the one or more processors are configured to select one or more repeaters whose respective coverage areas contain the target EP, and to forward the message only to the selected repeaters.

14. A method for communication, comprising:

in a communication network that comprises one or more replay modules and one or more repeaters, wherein the replay modules connect by Radio Frequency (RF) cable to RF interfaces of respective Base Stations (BSs) that provide connectivity between wireless devices and one or more servers over a packet network, wherein each repeater wirelessly communicates with one or more of the wireless devices, and further communicates with one or more of the BSs via respective replay modules, receiving, by one or more processors of the communication network, messages originating from one or more of the wireless devices and destined to the servers, the one or more processors comprised in at least one system component selected from a group consisting of (i) one or more of the replay modules, (ii) one or more of the repeaters, and (iii) a management cloud separate from the replay modules and the repeaters;

processing the messages to determine a scheduling plan for transmitting the messages to one or more selected BSs; and emulating to the selected BSs transmissions of the wireless devices by transmitting the messages to the selected BSs via the respective replay modules, in accordance with the scheduling plan.

15. The method according to claim 14, wherein processing the messages to determine the scheduling plan comprises selecting for each message at least one of: a time resource, a frequency resource, and an identity of one or more target BSs.

16. The method according to claim 14, wherein receiving the messages comprises wirelessly receiving by a repeater, a message transmitted by a wireless device, and wherein emulating to the selected BSs transmissions of the wireless devices comprises sending the received message directly to a replay module of a selected BS.

17. The method according to claim 14, wherein receiving the messages comprises wirelessly receiving by a first repeater a message transmitted by a wireless device or by a second repeater, and wherein emulating to the selected BSs transmissions of the wireless devices comprises sending the received message to a replay module of a selected BS.

18. The method according to claim 14, wherein receiving the messages comprises wirelessly receiving by a replay module a message transmitted by a wireless device, and wherein emulating to the selected BSs transmissions of the wireless devices comprises transmitting the message to the respective BS directly via the RF cable.

19. The method according to claim 14, wherein processing the messages comprises receiving multiple copies of a same message that are transmitted by a wireless device, and wherein emulating to the selected BSs transmissions of the wireless devices comprises filtering the copies by sending to a target BS a partial subset of the multiple copies.

20. The method according to claim 14, wherein processing the messages to determine the scheduling plan comprises scheduling transmissions to target BSs in accordance with a criterion that aims to balance traffic load among the target BSs.

21. The method according to claim 14, wherein emulating to the selected BSs transmissions of the wireless devices comprises sensing whether a given BS is currently transmitting or receiving, and in response to detecting that the given BS is currently transmitting, waiting until the given BS returns to a reception mode before transmitting any message to the given BS via the RF cable.

22. The method according to claim 14, wherein emulating to the selected BSs transmissions of the wireless devices comprises emulating to a target BS a transmission of a wireless device by providing to the respective replay module information indicative of a reception quality at a repeater that intercepted the transmission of the wireless device, and adjusting a transmission power in the replay module based on the information provided.

23. The method according to claim 14, emulating to the selected BSs transmissions of the wireless devices comprises scheduling transmission of one or more messages that were received by one or more repeaters and sent to multiple target BSs, and adjusting a transmission power in the respective replay modules of the target BSs based on at least one of respective identities of the repeaters and respective reception quality levels in the repeaters.

24. The method according to claim 14, wherein receiving the messages comprises wirelessly receiving a message by a repeater over a given wireless link, and wherein emulating to the selected BSs transmissions of the wireless devices comprises refraining from re-transmitting the received message wirelessly, by the repeater, over the given wireless link.

25. The method according to claim 14, wherein receiving the messages comprises wirelessly receiving by a repeater or a replay module a message from a wireless device in accordance with a first protocol, and wherein processing the messages to determine a scheduling plan comprises transmitting the received message to a target BS via the RF cable in accordance with a second different protocol.

26. The method according to claim 14, wherein receiving the messages comprises receiving by a replay module, from a respective BS, a message destined to a target EP, and wherein processing the messages comprises selecting one or more repeaters whose respective coverage areas contain the target EP, and forwarding the message only to the selected repeaters.

* * * * *